(12) United States Patent
McClaine et al.

(10) Patent No.: US 7,052,671 B2
(45) Date of Patent: May 30, 2006

(54) STORAGE, GENERATION, AND USE OF HYDROGEN

(75) Inventors: Andrew W. McClaine, Lexington, MA (US); Jonathan L. Rolfe, N. Easton, MA (US); Christopher A. Larsen, Dorchester, MA (US); Ravi K. Konduri, Canton, MA (US)

(73) Assignee: Safe Hydrogen, LLC, Lexington, MA (US)

( * ) Notice: Subject to any disclaimer, the term of this patent is extended or adjusted under 35 U.S.C. 154(b) by 625 days.

(21) Appl. No.: 10/044,813

(22) Filed: Jan. 11, 2002

(65) Prior Publication Data

US 2002/0166286 A1 Nov. 14, 2002

Related U.S. Application Data

(60) Continuation-in-part of application No. 09/707,105, filed on Nov. 6, 2000, now abandoned, which is a division of application No. 09/309,198, filed on May 10, 1999, now abandoned.

(60) Provisional application No. 60/261,616, filed on Jan. 12, 2001, provisional application No. 60/261,601, filed on Jan. 12, 2001, and provisional application No. 60/261,600, filed on Jan. 12, 2001.

(51) Int. Cl.
*C01B 3/04* (2006.01)

(52) U.S. Cl. .............. 423/658.2; 252/188.25; 252/188.26

(58) Field of Classification Search .............. 423/658.2; 252/188.25, 188.26
See application file for complete search history.

(56) References Cited

U.S. PATENT DOCUMENTS

| | | | |
|---|---|---|---|
| 2,626,204 A | 1/1953 | Kassel | |
| 3,101,592 A | * 8/1963 | Robertson et al. | ........ 60/39.463 |
| 3,174,833 A | 3/1965 | Blackmer | |
| 3,346,506 A | * 10/1967 | Beumel, Jr. | ............ 252/188.25 |
| 3,456,847 A | 7/1969 | Scott | |
| 3,649,360 A | 3/1972 | Bloomfield et al. | ...... 136/86 C |
| 3,674,702 A | 7/1972 | MacKenzie et al. | ......... 252/188 |
| 3,759,986 A | 9/1973 | Creger et al. | ............... 260/488 |
| 3,787,186 A | 1/1974 | Geres | |
| 3,975,913 A | 8/1976 | Erickson | ...................... 60/645 |
| 4,261,955 A | 4/1981 | Bailey, Jr. et al. | .......... 422/239 |
| 4,643,166 A | 2/1987 | Hubele et al. | |
| 4,769,225 A | 9/1988 | Reilly et al. | |
| 4,950,460 A | 8/1990 | Goodwin et al. | |
| 5,468,880 A | 11/1995 | Ueno et al. | ................. 549/263 |
| 5,707,499 A | 1/1998 | Joshi et al. | ................. 204/228 |
| 5,867,978 A | 2/1999 | Klanchar et al. | ......... 60/39.182 |

FOREIGN PATENT DOCUMENTS

| | | |
|---|---|---|
| GB | 1 425 590 | 2/1976 |
| JP | 56104701 | 8/1981 |
| JP | 6-174196 | 6/1994 |
| JP | 7-172801 | 7/1995 |
| WO | WO 01/51410 | 7/2001 |

OTHER PUBLICATIONS

Breault, Ronald W. et al., "Hydrogen For a PEM Fuel Cell Vehicle Using A Chemical–Hydride Slurry", 218th American Chemical Society Division of Fuel Chemistry Symposium, New Orleans, LA, Aug. 22–26, 1999.

Breault, Ronald W. et al., "Advanced Chemical Hydrogen Generation/Storage System for PEM Fuel Cell Vehicles", Thermo Power Corp., Peer Review Report to DOE Apr. 21, 2000.

(Continued)

*Primary Examiner*—Stanley S. Silverman
*Assistant Examiner*—Maribel Medina
(74) *Attorney, Agent, or Firm*—Fish & Richardson P.C.

(57) ABSTRACT

A composition comprising a carrier liquid; a dispersant; and a chemical hydride. The composition can be used in a hydrogen generator to generate hydrogen for use, e.g., as a fuel. A regenerator recovers elemental metal from byproducts of the hydrogen generation process.

15 Claims, 6 Drawing Sheets

OTHER PUBLICATIONS

Breault, Ronald W. et al., "Hydrogen Transmission/Storage with a Metal Hydride/Organic Slurry", Thermo Power Corp., Peer Review Report to DOE Apr. 21, 2000, Apr. 8, 1999.

Breault, Ronald W. et al., "Advanced Chemical Hydrogen Generation/Storage System for PEM Fuel Cell Vehicles", Thermo Power Corp., Peer Review Report to DOE Apr. 13, 1999.

Breault, Ronald W. et al., "Hydrogen Storage Canisters for DOD Fuel Cell Apllications Utilizing Chemical Hydrides", Jun. 13, 2000, presentation slides.

Breault, Ronald W. et al., "Advanced Chemical Hydride-Based Hydrogen Generation/Storage System for Fuel Cell Vehicles", Proceedings of the 1998 U.S. DOE Hydrogen Program Review.

Breault, Ronald W. et al., "Sustainable Hydrogen for the Hydrogen Economy," 218$^{th}$ American Chemical Society Division of Fuel Chemistry Symposia, New Orleans, LA, Aug. 22–26, 1999, vol. 44, No. 4.

Breault, Ronald W. et al., "Hydrogen Production and Storage with Chemical Hydride Slurry for Energy in the 21$^{st}$ Century", 25$^{th}$ International Tech. Conf. On Coal Utilization & Fuel Systems, Clearwater, FL, Mar. 6–9, 2000.

Breault, Ronald W. et al., "Hydrogen For A PEM Fuel Cell Vehicle Using a Chemical–Hydride Slurry", Proceedings of the 1999 U.S. DOE Hydrogen Program Review.

Breault, Ronald W. et al., "Hydrogen for the Hydrogen Economy", 24$^{th}$ Coal Utilization and Fuel System Conference, Clearwater, FL, Mar. 8–11, 1999.

Breault, Ronald W. et al., "Hydrogen Transmission/Storage with a Chemical Hydride/Organic Slurry", Proceedings of the 1999 U.S. DOE Hydrogren Program Review.

Breault, Ronald W. et al., "Hydrogen Transmission/Storage with a Chemical Hydride/Organic Slurry", 9$^{th}$ Canadian Hydrogen Conference, Vancouver, B.C., Feb. 7–10, 1999.

Breault, Ronald W. et al., Hydrogen Transmission/Storage with a Metal Hydride/Organic Slurry, PP002–98, 20 pp.

Holstvoogd, R.D., et al., "Continuous Absorption of Hydrogen in Metal Hydride Slurries", International Journal of Research in Physical Chemistry and Chemical Physics 164:1429–1434, 1989.

Kim, K.J. et al., "Cooling and Power Efficiency Diagrams for Compressor–Driven, Metal–Hydride Slurry Air Conditioners", *Energy* 22(8):787–796, 1997.

Kim, K.J. et al., "Heat–driven hydride slurry heat pumps", *Int. J. Refrig.* 20(5):339–351, 1997.

McClaine, Andrew W. et al., "Hydrogen Storage Using Slurries of Chemical Hydrides", Submission for "Advances in Hydrogen Energy", Jan. 6, 1980, 17 pp.

McClaine, Andrew W. et al., "Chemical Hydride Slurry for Hydrogen Storage", The Third Annual BCC Conference: Fuel Cells and the Hydrogen Infrastructure, Business Communications Co., Inc., Stamford, CT, Mar. 31–Apr. 1, 2003.

Ptasinsky, K.J. et al., "Hydrogen Recovery from Gas Mixtures Using Metal Hydrides Suspended in Slurry", Commission of the European Communities, Jan. 1, 1982–Dec. 31, 1983.

"Advanced Chemical Hydride–Based Hydrogen Generation/Storage System for PEM Fuel Cell Vehicles", Final Report, Period: Oct. 1997–Jun. 2000, Submitted Mar. 2001.

"Advanced Chemical Hydride–Based Hydrogen Generation/Storage System for PEM Fuel Cell Vehicles", Quarterly Report: Oct. 9, 1999–Dec. 1999, Submitted Jan. 25, 2000.

AOP FY2000, "Hydrogen ($H_2$) Transmission/Storage with Metal Hydride Organic Slurry—Thermo Power Corporation", Sep. 3, 1999.

AOP FY2001, "Hydrogen ($H_2$) Transmission/Storage with Chemical Hydride Organic Slurry—Thermo Power Corporation", Aug. 31, 2000.

AQMD, "Generating Pure Hydrogen Fuel Onboard Vehicles Using A Chemical Hydride Slurry System", Phase 2 Final Report, Submitted Sep. 28, 2000.

Canister Program Final Report, "Lithium Hydride Hydrogen Canister for DOD Fuel Cell Application", Thermo Power Corporation, Jan. 12, 2000, 14 pp.

"Development and Demonstration of Advanced Hydrogen Fuel Storage System Using Chemical Hydride Slurry System", Phase 1 Technical Overview Report, Period: Oct. 1997–Sep. 1998, Submitted Jul. 29, 1999.

"Development of Hydrogen Transmission/Storage with a Metal Hydride/Organic Slurry", Phase 1 Summary Report, Apr. 1998.

"VII. Hydrogen Storage. B. Advanced Chemical Hydride Hydrogen Generation/Storage System for PEM Fuel Cell Vehicles", *Fuel Cells for Transportation*, FY 1999 Contractor's Progress Report.

FY2000 Contractor's Progress Report, Advanced Chemical Hydride Hydrogen Generation/Storage System for PEM Fuel Cell Vehicles.

"Hydrogen Transmission/Storage with a Chemical Hydride/Organic Slurry", Final Report, Period: Apr. 1997–Oct. 2000, Submitted Mar. 2001.

Chemical/Hydrogen Energy Systems: 1987 Annual Report.

Search Report, "Abstracts/KWIC of Publications containing the Keywords 'Hydride Slurry'", (Safe Hydrogen Documents) 1967–2001, 12 pp.

Search Report, "Abstracts of US and Foreign Patents/Publications Containing the Keywords 'Hydrogen?(20N) Hydride?(5N) Slurry'", (Safe Hydrogen Documents) 1963–2001, 126 pp.

Ronald W. Breault and Jon Rolfe, "Advanced Chemical Hydride–Based Hydrogen Generation/Storage System for Fuel Cell Vehicles," Thermo Power Corporation, Waltham, MA.

Ronald W. Breault et al., "Hydrogen Transmission/Storage With a Metal Hydride/Organic Slurry," Proceedings of the 1998 U.S. DOE Hydrogen Program Review, Apr. 28–30, 1998.

Ronald W. Breault et al., "Hydrogen for a PEM Fuel Cell Vehicle Using a Chemical–Hydride Slurry," 10$^{th}$ National Hydrogen Association Conference, Tysons Corner, VA, Apr. 7–9, 1999.

Thermo Power Corporation, "Advanced Chemical Hydride-Based Hydrogen Generation/Storage System for PEM Fuel Cell Vehicles—Final Report," Mar. 2001.

Thermo Power Corporation, "Hydrogen Transmission/Storage With a Chemical Hydride/Organic Slurry—Final Report," Mar. 2001.

Thermo Power Corporation, "Generating Pure Hydrogen Fuel Onboard Vehicles Using a Chemical Hydride Slurry System—Phase 2 Final Report Appendices A & B," Sep. 28, 2000.

* cited by examiner

STORAGE, GENERATION, AND USE OF HYDROGEN

This application claims the benefit of the filing dates of Provisional U.S. Patent Applications Ser. No. 60/261,616, Hydrogen Fuel Storage Slurry, Jonathan L. Rolfe et al.; Ser. No. 60/261,601, Hydrogen Fuel Generation Assembly and Method, Christopher A. Larsen et al.; and Ser. No. 60/261, 600, Regeneration Assembly and Method for Converting Metal Oxides and Metal Hydroxides to Elemental Metals, Ravi Konduri et al., all of which were filed on Jan. 12, 2001, and all of which are incorporated here by reference in their entireties.

This application is a continuation-in-part of U.S. patent application Ser. No. 09/707,105, Disposable Hydrogen Fuel Source, filed Nov. 6, 2000 now abandoned, which is a divisional of U.S. patent application Ser. No. 09/309,198, filed May 10, 1999, now abandoned, and is incorporated by reference here in its entirety.

This invention was made with Government support under contracts awarded by the U.S. Department of Energy. The Government has certain rights in the invention.

BACKGROUND

This invention relates to the storage, generation, and use of hydrogen.

Traditional storage technologies for hydrogen include bottled compressed hydrogen gas and bottled liquid hydrogen. The use of such technologies has been limited because of dangers in storage and in handling and transporting. Hydrogen gas and cryogenic liquid in storage or transport have evidenced instability and high combustibility.

Hydrogen also has been incorporated into metal hydrides from which the hydrogen can be released by the application of water. U.S. Pat. No. 4,155,712, issued May 22, 1979, to Walter G. Taschek, discloses a hydrogen generator in which water vapor is combined with a metal hydride, preferably calcium hydride ($CaH_2$) or lithium aluminum hydride ($LiAlH_4$) to release hydrogen ($H_2$) stored in the hydride. U.S. Pat. No. 4,261,955, issued Apr. 14, 1981, to Cornelius E. Bailey, Jr., et al, describes subjecting a metal hydride, such as calcium hydride, to water vapor to generate essentially pure hydrogen.

Known hydrogen-fueled power devices include fuel cells, internal combustion engines, and other devices.

Mixing a light metal hydride, such as lithium hydride and a reactant, such as water to produce hydrogen also produces, as a byproduct, a hydroxide of the elemental metal, lithium hydroxide. Although the generation of hydrogen in such a process can occur on a continuing basis, the byproduct, i.e., the lithium hydroxide, accumulates until removed.

SUMMARY

In general, in one aspect, the invention features a composition comprising a carrier liquid; a dispersant; and a chemical hydride. Implementations of the invention may include one or more of the following features. The chemical hydride has a concentration of at least 40% by weight of the composition. In some examples, the chemical hydride has a concentration of less than 75% by weight of the composition, for example, about 61%. In other examples, the chemical hydride has a concentration of more than 90%. The carrier liquid includes an organic liquid. The organic liquid includes mineral oil, e.g., a light mineral oil. The carrier liquid includes a hydrocarbon. The hydrocarbon includes an alkane. The alkane is selected from a group consisting of pentane and hexane. The composition is in the form of a slurry. The carrier liquid has a viscosity in the range of about 32 Saybolt Universal seconds (S.U.s.) at standard temperature and pressure (STP) to about 100 S.U.s but preferably about 42 S.U.s. to about 59 S.U.s. The carrier liquid exhibits a flash point in the range of about 100° C. to about 350° C. and preferably about 154° C. to about 177° C.

The chemical hydride includes a light metal hydride. The light metal hydride is selected from the group consisting of lithium hydride, lithium borohydride, lithium aluminum hydride, sodium hydride, sodium borohydride, sodium aluminum hydride, magnesium hydride, and calcium hydride. The chemical hydride includes lithium hydride.

The dispersant comprises a triglyceride. The triglyceride includes a triglyceride of oleic acid. The triglyceride includes triolein. The chemical hydride includes magnesium hydride.

In general, in another aspect, the invention features a method that includes mixing chemical hydride particles and an oil to form a slurry.

In general, in another aspect, the invention includes a composition comprising a mass of chemical hydride particles in a concentration of about 90–95% by weight of the composition, and an oil coating the chemical hydride particles, the oil comprising 5–10% by weight of the composition.

In general, in another aspect, the invention features apparatus comprising: a reservoir containing a chemical hydride, and a mechanism configured to introduce a reactant to selected different portions of the chemical hydride to effect hydrogen generating reactions at different locations within the reservoir.

Implementations of the invention may include one or more of the following features. The reservoir includes a canister. The reservoir includes chambers that contain chemical hydride. The mechanism includes conduits that have open delivery ends arranged to introduce the reactant to respective selected portions of the chemical hydride. The conduits are arranged in parallel. The ends are located at different distances along an axis of the reservoir. The mechanism is configured to be movable relative to the chemical hydride contained in the reservoir. The conduits comprise needles. The mechanism includes a valving system that controls the introduction of the reactant to the different portions. The reservoir includes an exit for hydrogen generated in the reaction.

In general, in another aspect, the invention features a hydrogen fuel generation assembly that includes: (a) a reservoir for a slurry comprising a carrier liquid, a triglyceride dispersant, and a chemical hydride; (b) a reservoir for water; (c) a hydride reactor in communication with said slurry reservoir and said water reservoir and adapted to receive the slurry and water from the reservoirs, respectively, and to mix the slurry and water to effect release of hydrogen from the slurry; (d) a tank for receiving the hydrogen from said reactor and for receiving hydroxide byproduct from said reactor, and for facilitating separation of the hydrogen and the hydroxide byproduct; (e) a heat exchanger for receiving the hydrogen from said tank and adapted to condense water from the hydrogen; (f) a gas-liquid separator for receiving hydrogen and water from said heat exchanger and adapted to separate the water from the hydrogen and to dispense dried hydrogen; (g) a conduit for conveying the water from said separator to said water reservoir; and (h) a conduit for conveying the dried hydrogen to a hydrogen-fueled power-producing device.

Implementations of the invention may include one or more of the following features. The reactor includes a tubular housing and a mixer for mixing the slurry and the water. The tank is provided with an outlet for flowing hydrogen gas from the tank, and a bottom portion for the receiving of the hydroxide byproduct. The power-producing device includes a selected one of a fuel cell, an internal combustion engine, and an external combustion engine. There are also conduit means for conveying condensed water from said fuel cell to said water reservoir. The power-producing device includes a selected one of the internal combustion engine and the external combustion engine and the assembly further includes a condenser for condensing water from water vapor from said engine, said condenser being in communication with means for conveying water from said condenser to said water reservoir.

In general, in another aspect, the invention includes a method for generating hydrogen fuel for a power-producing hydrogen-fueled device, the method includes the steps of: (a) providing a slurry comprising an organic carrier liquid, a triglyceride dispersant, and a chemical hydride; (b) mixing said slurry with water to effect release of hydrogen from the slurry; (c) removing water vapor from the hydrogen released from the slurry, to provide dried hydrogen; and (d) conveying the dried hydrogen to the hydrogen-fueled device for the production of power.

Implementations of the invention may include one or more of the following features. The organic carrier liquid includes a light mineral oil. The mixing of said slurry and said water is undertaken with an auger. The water removed from the hydrogen is returned back to a source of the water for mixing with the slurry. Water condensed from a fuel cell is returned to a source of the water for mixing with the slurry.

In general, in another aspect, the invention features a regeneration assembly for converting metal oxides and hydroxides to elemental metals, the assembly comprising: (a) a reactor adapted to receive the metal hydroxide and carbon, and adapted to retain a molten carbon-dissolving metal in the reactor; (b) means for flowing gases comprising the elemental metal in gaseous form, carbon monoxide, and hydrogen from said reactor; (c) a condenser adapted to receive the gases flowed from said reactor and adapted to discharge carbon monoxide and hydrogen from a first outlet and the elemental metal, metal oxide, and carbon from a second outlet; (d) a separator adapted to receive the elemental metal, oxide thereof, and carbon from said condenser and to discharge the elemental metal in gaseous form; (e) means for flowing the elemental metal and the carbon dissolving metal in liquid form from said reactor to said separator; and (f) means for flowing the metal oxide and the carbon dissolving metal from said separator to said reactor.

Implementations of the invention may include one or more of the following features. A second separator receives the carbon monoxide and hydrogen from said condenser, said second separator having a first outlet for discharging carbon monoxide and a second outlet for discharging hydrogen.

In general, in another aspect, the invention features a method for converting metal oxides and metal hydroxides to elemental metals thereof, the method comprising the steps of: (a) admitting the metal hydroxide and carbon into a reactor having molten carbon-dissolving metal therein; (b) flowing gases comprising the elemental metal in gaseous form, carbon monoxide and hydrogen from the reactor to a condenser; (c) condensing out the elemental metal and oxide thereof, and carbon, and flowing same to a separator; (d) flowing carbon monoxide and hydrogen from the condenser; (e) flowing the elemental metal and the carbon dissolving metal from the reactor to the separator; (f) flowing elemental metal oxide and the carbon dissolving metal from the separator to the reactor; and (g) flowing the elemental metal from the separator. In some implementations, an inert gas is flowed into the reactor.

Other advantages and features will become apparent from the following description and from the claims.

DESCRIPTION (FIGS. 1, 2, 3, and 6 show hydride containers with water feed tubes.

The Slurry

Figure 1:
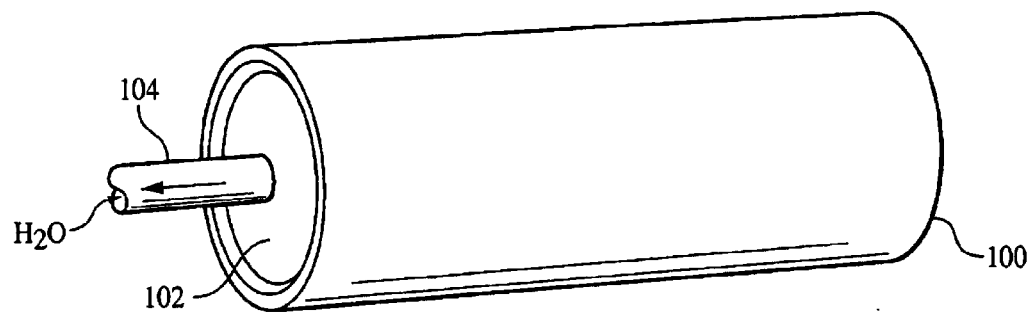

Hydrogen fuel can be stored in a medium that takes the form of a slurry. The slurry includes a carrier liquid, such as an organic carrier, a dispersant, such as a triglyceride, for stabilizing the slurry, and a chemical hydride dispersed in the carrier liquid at a concentration of at least 40 and typically less than 75%, except for a dry, non-pumpable slurry described later, in which the concentration may be higher. The best range can be determined experimentally. Higher percentages yield higher energy densities. Lower percentages are less viscous. A good tradeoff for a slurry of LiH with light mineral oil and a triglyceride dispersant is about 61% of LiH. Above this percentage, the slurry became too thick to pump. Higher concentrations may be achievable by replacing LiH with $MgH_2$.

Typical slurries will be in the 50–70% range depending on the hydride used. LiH slurries will likely be in the 50–61% range. A thinner slurry, with as little as 40% hydride by weight of the slurry may be useful for certain applications.

The slurry may be safely stored and transported and the hydrogen may be easily extracted for use as a fuel. The slurry is not highly flammable or combustible and may be safely handled, stored, and transported. The slurry is stable at normal environmental temperatures and pressures and, because it is a liquid, can easily be pumped through conduits. The reaction rate with the slurry is easily controlled.

The Carrier Liquid

The carrier liquid may be an organic carrier liquid, such as mineral oil or a low molecular weight hydrocarbon, such as an alkane, preferably pentane or hexane. A preferable mineral oil is a nontoxic light mineral oil which exhibits a high flash point, in the range of about 154 degrees C. to about 177 degrees C. and a viscosity in the range of about 42 Saybolt Universal seconds (S.U.s.) to about 59 S.U.s.

The mineral oil is not chemically reactive with metal hydrides, produces relatively low vapor pressure, and remains liquid through a temperature range of about −40 to 200 degrees C. The carrier liquid renders the slurry pumpable and, as a safe liquid, simple to store or transport. The carrier slows the reaction rate when water is introduced into the hydride. The use of a slurry permits easy refueling, as by simply topping off a tank. Other carriers may work well, including carriers that are without water bonds and preferably are without OH bonds. Silicone-based carriers may also work for slurries. Light mineral oils have been tested successfully at percentages of 37 to 50% by weight of the slurry.

The Dispersant

The dispersant in the slurry may be, for example, a triglyceride dispersant, which sterically stabilizes the slurry. The triglyceride dispersant preferably is triglyceride of oleic acid, or triolein. Triolein is not normally considered to have the properties of a dispersant. Other dispersants that could be used include Hypermer LP1, a polymeric dispersant. One function of the dispersant is to attach to the particles of chemical hydride, increasing the drag of the particle in the carrier fluid thus helping to prevent settling. The dispersant also helps to keep the particles from agglomerating. The dispersant promotes the formation of the slurry and the stabilization of the hydride into the mineral oil.

Good dispersant concentrations range from 0.68% to 1.88% in tests. A particularly good percentage is 0.75%. A broader range of percentages, from about 0.5 to about 2% of the slurry could be used. Instead of tryglicerides, the dispersants could be polymeric dispersants. A combination of triglyceride and polymeric dispersants may also be used, and may be particularly useful if the hydride is magnesium hydride.

Dispersants sometimes have surfactant properties that may also be useful in the formation of the slurry.

The Chemical Hydride

U.S. patent application Ser. No. 09/309,198, filed May 10, 1999, and incorporated by reference in its entirety, discloses hydrogen-containing material, such as lithium hydride, lithium aluminum hydride, calcium hydride, sodium hydride, magnesium hydride, and others, for contact with a reactant, such as water, to produce hydrogen.

The chemical hydride in the slurry may be a light metal hydride, such as lithium hydride, lithium borohydride, lithium aluminum hydride, magnesium hydride, calcium hydride, sodium hydride, sodium borohydride, and sodium aluminum hydride, all of which react with water to produce high purity hydrogen.

Examples of reactions are:

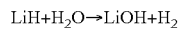
$LiH+H_2O \rightarrow LiOH+H_2$

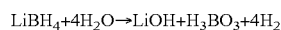
$LiBH_4+4H_2O \rightarrow LiOH+H_3BO_3+4H_2$

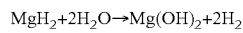
$MgH_2+2H_2O \rightarrow Mg(OH)_2+2H_2$

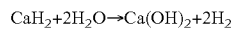
$CaH_2+2H_2O \rightarrow Ca(OH)_2+2H_2$

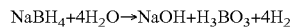
$NaBH_4+4H_2O \rightarrow NaOH+H_3BO_3+4H_2$

The hydrides are finely ground before being mixed with the other components of the slurry. The particles of the slurry are between 5 and 10 microns in diameter.

To make the slurry, we start with a powder form of hydride. This powder is first combined with a mixture of the mineral oil and dispersant. Then the mixture is ground in a grinder to further reduce the size of the particles. The final particles were measured to be primarily between 5 and 10 microns in diameter.

The hydrogen generation capability of the above hydrides when reacted with water is outstanding. For example, the volume of $H_2$ produced by complete hydrolysis of 1 kg. (2.2 lb.) of lithium hydride is 2800 liters (99 ft$^3$), and by complete hydrolysis of 1 kg of lithium borohydride is 4100 liters (145 ft$^3$)

Characteristics of the Slurry

In summary, pumpable mixtures (slurries) can usefully have proportions of components that are 40–75% hydride (but see the later discussion concerning dry slurries having greater concentrations), 28–59.5% carrier, and 0.5 to 2% dispersant. A particularly good mixture is 60% lithium hydride, 0.75% triglyceride, and 39.25% light mineral oil.

Slurries of the kind described here (with hydride concentrations less than about 75%) have a liquid-like flow characteristic and may be used in generation processes that involve continuous formation and extraction of hydrogen. In such processes, the slurry can be continuously introduced into a tank, while a portion of the slurry is continuously drawn off and subjected to water to release hydrogen. The reaction may be stopped and started quickly and repeatedly without sacrificing control of the reaction or safety.

The oil in the slurry protects the hydride from unintentional contact with moisture in the air and renders the hydride pumpable. The slurry, when in the form of a continuing stream, provides a path for dissipating heat generated from the hydride/water reaction. That, in conjunction with control of surface chemistry of the carrier liquid, permits easy control of the hydride reaction rate. In a continuous process, the hydrogen production rate is controlled by the injection rate of water and hydride.

Because the oil inhibits water access to the hydride, it controls the rate of reaction, which otherwise could be explosive. The dispersant maintains the hydride particles in suspension. The dispersant attaches to the particles and fends off adjacent particles to prevent agglomeration of the particles. The mineral oil protects the particles from unintentional reaction with water. The amount of the dispersant and the size of the hydride particles control the viscosity of the slurry.

The slurry burns only if high heat is applied, as by a blow torch, and maintained. Upon removal of heat, the burning of the slurry ceases and flames die out.

Alternative Dry Slurry

An alternative hydrogen storage medium would be in the form of a dry slurry comprising 90%–95% hydride. When a drop of water is injected into a mass of dry slurry in a test tube, a volume of about 1 cubic centimeter of the hydride around the droplet reacts with the water, releasing hydrogen. Some of the water flashes to steam and the steam reacts with hydride as it escapes the tube with the released hydrogen.

As shown in FIG. 1, this effect can be exploited by packing dry hydride slurry 102 into a tube 100 and pulling a needle 104 (which had been placed in the tube when it was packed) out of the tube while intermittently passing water droplets through the needle. Each water droplet would then strike fresh hydride until the needle is fully withdrawn.

Figure 2:
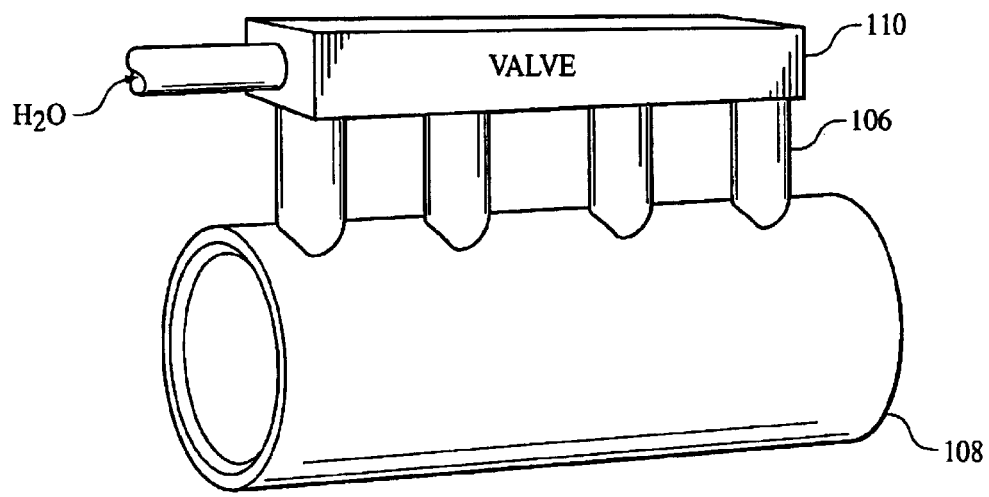

As shown in FIG. 2, an alternate configuration would be to locate needles 106 strategically throughout (e.g., along the length of) a large mass of dry hydride or in tubes 108 of hydride (only one tube is shown in FIG. 2). A valve 110 would then be controlled to selectively put water droplets into different parts of the mass or into different parts of the tube to produce hydrogen as required. This arrangement would have the advantage of requiring only one moving part, the valve, and would provide the opportunity to control where the heat is being generated and how the heat of reaction is dissipated.

Figure 3:
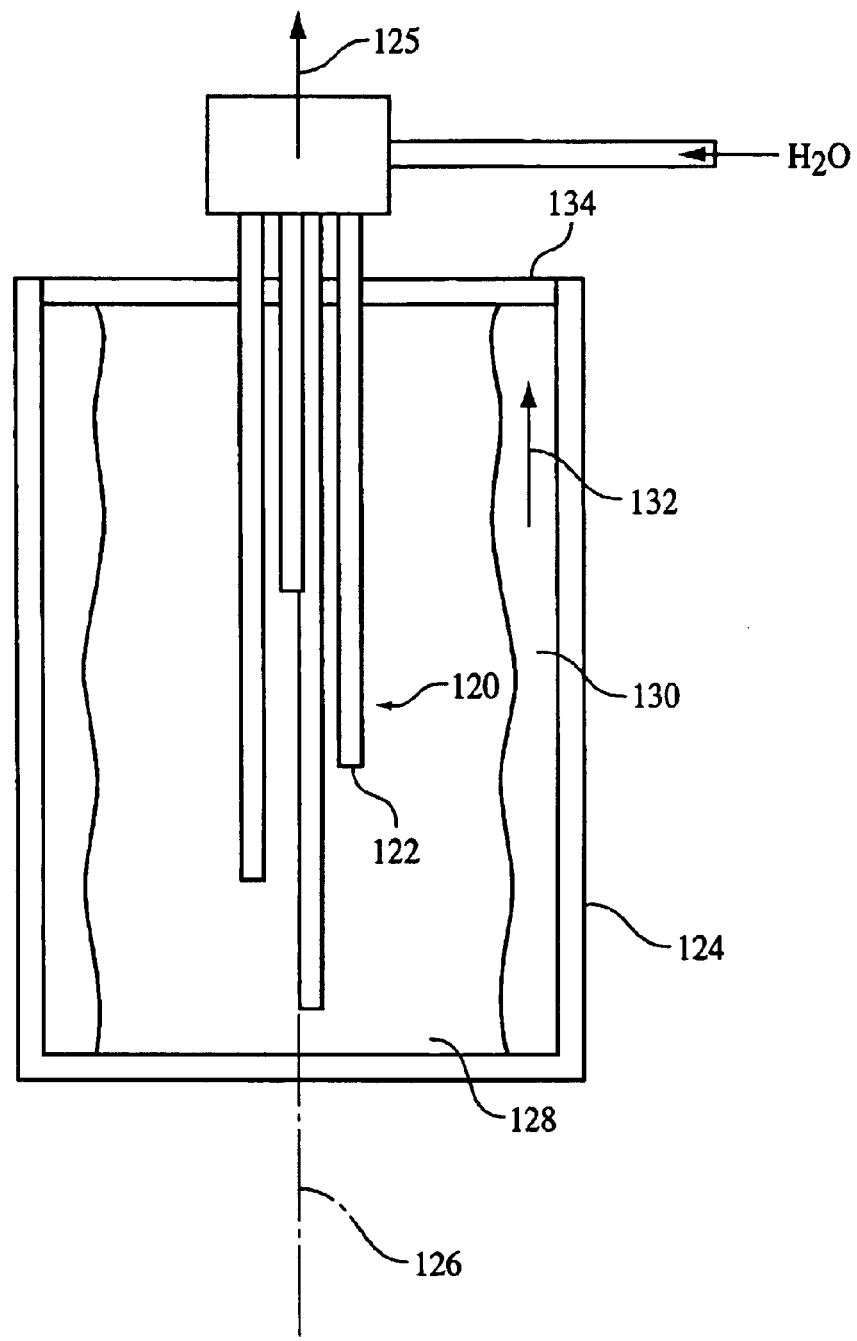

As shown schematically in FIG. 3, another configuration would use several parallel needles 120 with ends 122 located at different distances along the length of a tube of hydride 124. As the water drops are supplied simultaneously to all of the needles of the set, hydride would be reacted along the tube at several locations. Then the set of needles would be moved outward 125 along the centerline 126 of the tube so that the ends 122 are in contact with new hydride slurry. This configuration reduces the distance that must be traversed by any one needle. Because reacted hydride 128 will exist downstream of the lower needles, a path of egress 132 must be provided for the generated hydrogen and steam. The path could be provided by non-reacting porous material 130 positioned along the wall of the hydride tube far enough away from the centerline of the tube so that all the water vapor is consumed in reaction with hydride before the gases reach the porous wall. Then only hydrogen would be conducted along the porous material to an outlet end 134.

The oil in the dry slurry coats the hydride particles and reduces the rates of reactions with the slurry.

The Hydrogen Generator

Figure 4:
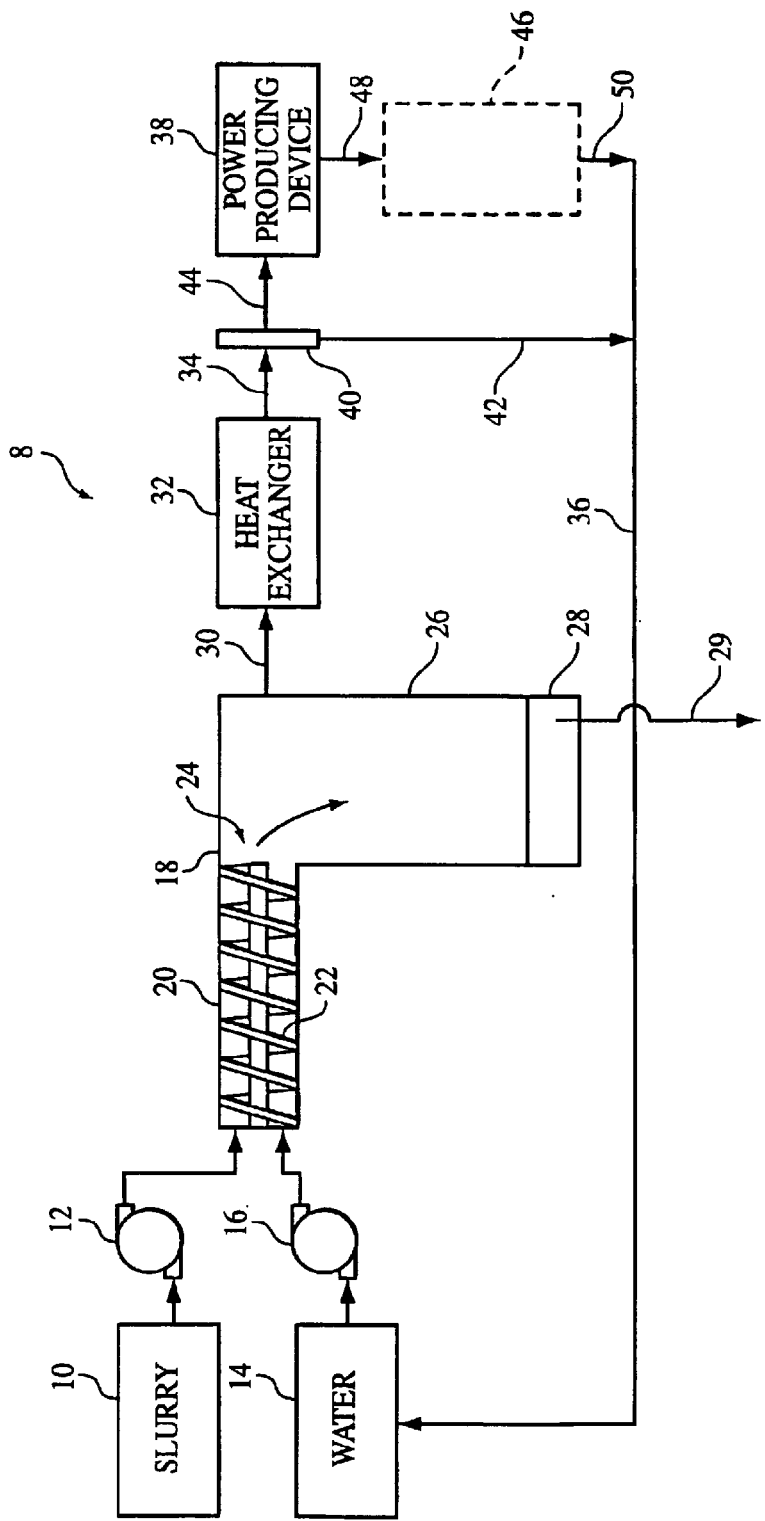
FIG. 4 is a block diagram of a hydrogen generator.

As shown in FIG. 4, a wet slurry can be used to generate hydrogen in a hydrogen fuel generation assembly 8 that includes a reservoir 10 for the slurry, a reservoir 14 for water, and a hydride reactor 18. The water and slurry are delivered by pumps 16, 12 to the reactor 18, which mixes the slurry and water to release hydrogen. A tank 26 receives the hydrogen and hydroxide waste from the reactor, and separates the hydrogen from the hydroxide byproduct. A heat exchanger 32 receives the hydrogen (and associated water vapor) carried in conduit 30 from the tank and condenses the water.

A gas-liquid separator 40 receives hydrogen and water carried in line 34 from the heat exchanger, separates the water from the hydrogen, and dispenses dried hydrogen and water in discrete streams 44, 42. (The water that is carried in conduit 34 is partly in droplet form, and partly in liquid stream form.) The water from the separator is conveyed to the water reservoir 14 (or to water flowing from the reservoir to the reactor) through conduits 42, 36, and the dried hydrogen is conveyed to a hydrogen-fueled power-producing device 38, such as a fuel cell.

In FIG. 4, the hydride reactor 18 includes a tubular member 20 housing a mixing device, such as an auger 22, rotatable in the housing. Other mixing devices could also be used including ultrasonic mixers or vibratory mixers.

The amount of water pumped to the reactor 18 is more than is needed to complete the release of hydrogen from the slurry. The excess water is converted to steam and carries heat produced in the reaction out of the reaction chamber, thus controlling the temperature of the reaction.

The tubular member 20 may be fixed to, or otherwise in communication with an inlet 24 of the tank 26. In tank 26, the hydroxide solid material falls to the bottom 28 for removal by way of an outlet 29.

When the hydrogen-fueled power-providing device is a fuel cell 38, water condensed from the exhaust of the fuel cell is also returned to the water reservoir 14, or to the water flowing from the reservoir to the reactor.

When the hydrogen-fueled power-providing device 38 is an internal or external combustion engine, the assembly also includes a condenser 46 that accepts water vapor from the device 38 through a conduit 48 and condenses water. The condensed water passes through conduit 50 into the conduit 38 for return to the water reservoir 14 (or water flowing from the reservoir into the reactor 18).

Thus, hydrogen suitable for use with fuel cells or engines, for example, is generated by providing a slurry including an organic carrier liquid, such as a light mineral oil, a triglyceride dispersant, and a chemical hydride, such as lithium hydride, mixing the slurry with water to release hydrogen from the slurry, controlling the reaction temperature by vaporization of water, condensing water from the hydrogen released from the slurry, and conveying the dried hydrogen to the hydrogen-fueled power-producing device.

The slurry may be prepared at centralized plants, where it is readily pumpable into tank trucks or through pipes to distribution centers where the slurry can be pumped into tanks of vehicles powered by hydrogen fuel cells, or into slurry reservoirs of homes or business and industrial facilities. The hydroxide byproduct of the hydrogen production reaction may be picked up upon the next delivery of slurry is made and transported back to a regeneration plant, where the hydroxide will be separated from the mineral oil and will be regenerated to hydride, as explained below.

Other Techniques for Distributing Water to the Hydride

Figure 6:
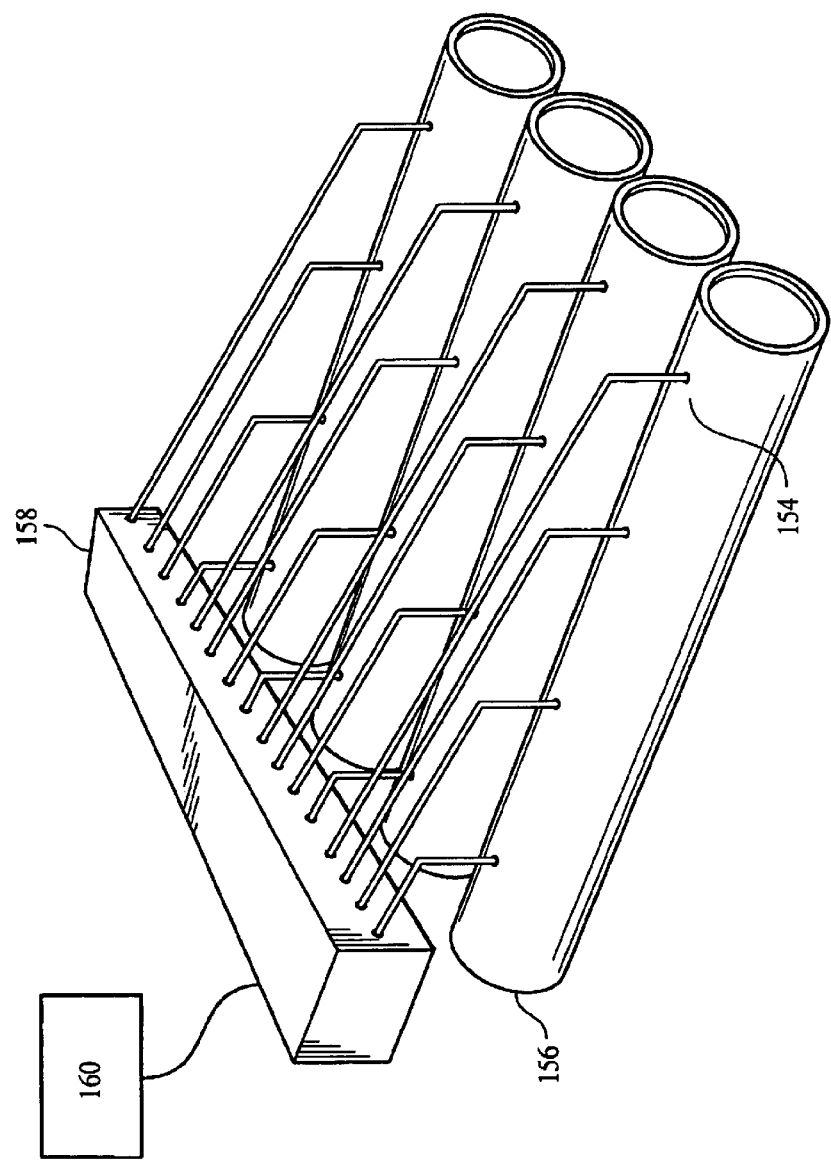

As shown in FIG. 6, another method of distributing water to the hydride in a chamber is through needles placed in hydride tubes in locations that permit water droplets that pass through needles to react with enough of the hydride to release more than 90% of the potential hydrogen. Several needles could be placed along the length of each tube. Water would be delivered first to the needle 154 that is farthest from the exit of the tube 156. This water would react with the hydride around it. Some of the water would be evaporated and would travel through unreacted hydride causing further reaction along the tube. A valving system 158 would be incorporated with the tubes of hydride to deliver water to the needles selectively. A computer control system 160 would record which needles had already delivered water and would select needles that had not delivered water for future hydrogen release.

The system of FIG. 6 overcomes the blockage of water and hydrogen flow to all portions of hydride by the metal hydroxide byproduct that is formed during the reaction. By selecting the sequence of tubes and needles for water injection, water is delivered only to fresh hydride. The arrangement of FIG. 6 also allows the heat released from the reaction in one tube to be dissipated from the tube while another tube in the system is reacting with water to deliver hydrogen. By causing the reactions to occur in different tubes, the heat of reaction on one tube can dissipate to the environment while slurry and water are reacting in another tube to continue to produce hydrogen. The system may be designed so that the heat in one tube is dissipated before another reaction must take place in that tube. This will control the temperature of the tube and the materials within the tube.

Alternatively, the needles could be retractable from the tubes in a manner similar to that shown in FIG. 3.

Small Scale Implementation

Figure 8:
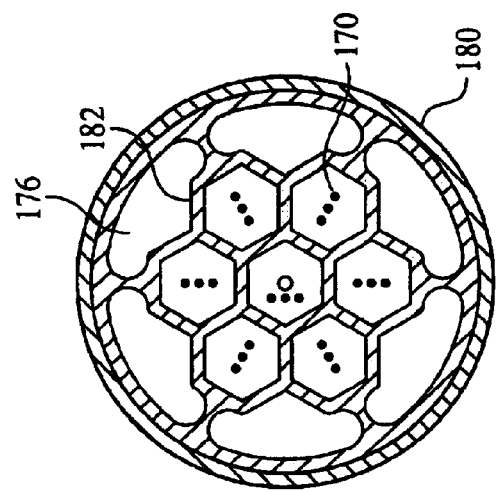
FIGS. 7 and 8 are side sectional and top views of a hydrogen generation canister.)
Figure 7:
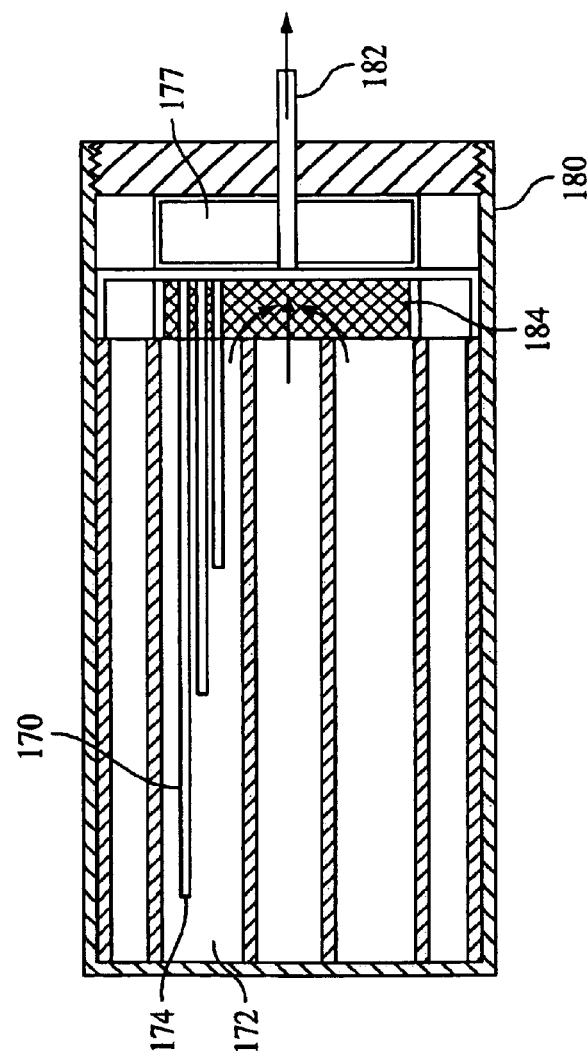

In a small scale implementation, shown in FIGS. 7 and 8, the water supply tubes 170 are buried in a bed 172 of chemical-hydride slurry in such a manner that each supply tube will provide enough water to react with the chemical hydride near the outlet 174 of the tube. Water is stored in chambers 176 located around the perimeter of a canister 180 that holds the lithium hydrid tubes 182. A valve 177 sequentially directs charges of water to each successive region of chemical hydride. The valving mechanism could be based on inkjet technology. Water charges would be supplied when the pressure in the canister drops below a set value. In this manner, the pressure in the canister will be cycled between a high value of about 200 psi and a low value of about 50 psi. The generated hydrogen exits the canister through conduit 183 after passing through a carbon filter 184.

The hydrogen produced could be consumed by an attached fuel cell as fast as it is generated and the electricity produced by the fuel cell may be stored in a battery or capacitor.

By supplying discrete charges of water sufficient to react with the chemical hydride within a specified diameter of the release location, the reaction within the canister 176 can be controlled so that there is never a surplus of water. As the chemical hydride reacts with water, its volume increases. This increased volume occupies the storage volume of the water that is consumed, to achieve a minimum system volume. Flexible walls 190 enable the water supply chambers and the hydride tubes to change volume as needed.

The Hydrogen Regenerator

The hydroxide byproduct can be processed to regenerate its elemental metal component. The metal can then re-used in the hydride fuel generating process by hydrogenating the elemental metal to produce the hydride fuel.

Figure 5:
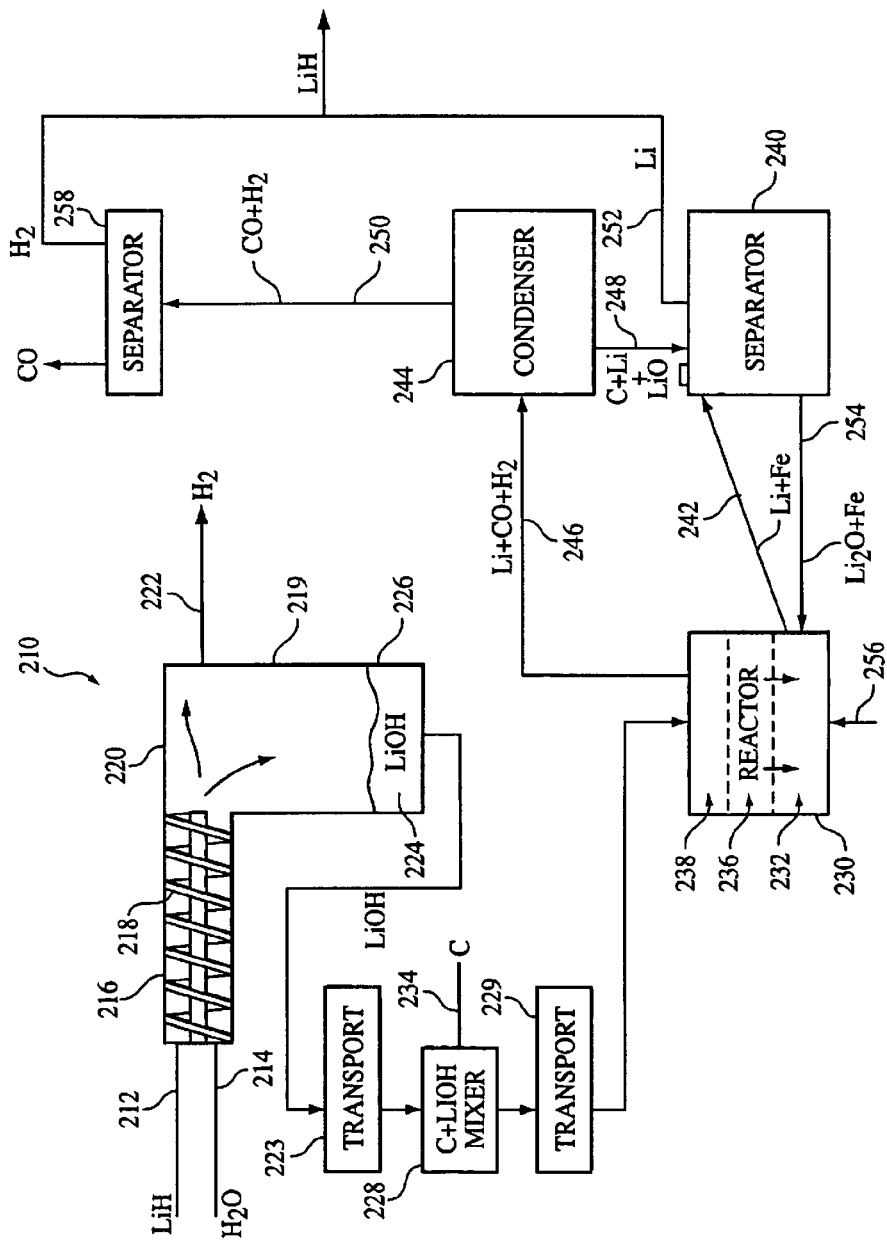
FIG. 5 is a block diagram of a hydrogen generator and a metal regenerator.

As shown in FIG. 5, the hydrogen generation assembly is similar to the one shown in FIG. 4 and includes a reactor 210 and inlet tubes 212, 214 which convey slurry and water, respectively, to the reactor 210. The reactor 210 includes a tubular portion 216 housing an auger 218 for mixing the slurry and water to effect release of hydrogen gas ($H_2$) from the slurry. A reactor tank portion 219 receives the hydrogen gas and solid matter from the auger 218. The hydrogen gas moves toward a top portion 220 of the reactor tank portion 219 and is carried by a conduit 222 to a separator (not shown) for drying the hydrogen. The hydroxide, which is a wet solid dust 224, falls to a bottom portion 226 of the reactor tank portion 219, from which it is removed and conveyed by transport means 223 to a mixer 228. Mixer 228 receives carbon through a conduit 234 and mixes the carbon with the hydroxide. The conduit 234 introduces the carbon, in solid or fluid form, such as coal in pellet or powder form, biomass, or graphite, to the mixer 228. The mixed carbon and hydroxide are transported by transport 229 to a second reactor 230 where there is disposed a molten pool 232 of carbon dissolving metal, such as iron, nickel, manganese, and alloys of those metals. The metal, because of its high heat capacity and thermal conductivity, provides superior heat transfer characteristics.

Alternatively, the mixer 228 may be omitted and the carbon and hydroxide fed directly into the reactor 230.

The intermixed carbon and hydroxide particles form a layer 238 in the reactor 230, the layer 238 descending into a layer 236, and then sinking into the pool of molten carbon dissolving metal 232. In layer 236, decomposition of hydroxide into oxide and water vapor occurs. In layer 232, the reaction between carbon and metal oxide produces elemental metal and carbon monoxide.

In one example, the hydroxide is lithium hydroxide (LiOH) and the carbon-dissolving metal is iron (Fe). The lithium hydroxide and carbon introduced into the second reactor 230, forms the upper layer 328 which descends in the reactor 230 and in the area of layer 236 produces lithuim oxide ($Li_2O$), water ($H_2O$), hydrogen ($H_2$) and carbon monoxide (CO). The hydrogen ($H_2$) and carbon monoxide (CO) rise toward the top of the reactor 230. Lithium oxide ($Li_2O$) and carbon (C) sink into the molten pool of iron (Fe) where they produce lithium metal (2Li), carbon monoxide (CO) and iron. (Fe).

In the molten layer 232, lithium gas (Li) is also produced, which rises to the second reactor upper portion 238. Liquid lithium (Li) and iron (Fe) pass from the second reactor metal pool 232 to a separator 240 through a conduit 242. The gaseous lithium (Li) in the upper portion 238 of the reactor 230, along with hydrogen ($H_2$) and carbon monoxide (CO), pass through a conduit 246 to a condenser 244. Condenser 244 separates out carbon, lithium, and lithium oxide, which, in solid/liquid form, pass into the separator 240 through a conduit 248. The condenser 244 discharges carbon monoxide and hydrogen gas through a conduit 250 to another separator 258, which separates the carbon monoxide from the hydrogen.

In the separator 240, the lithium (Li) is evaporated and released through conduit 252 in vapor form, while the lithium oxide ($Li_2O$), in liquid form, is passed through conduit 254 to the molten metal pool 232 in the second reactor 230. The lithium discharged by the separator 240 and the hydrogen discharged by the separator 258 may be recycled for use in the hydride slurry.

Pumps may be used in the assembly as needed. For example, the conduits 242, 254 may have magnetohydrodynamic pumps for pumping molten metal. The molten metal pool 232 may be maintained at a temperature of at least 1500° Kelvin, somewhat above the melting temperature of carbon saturated iron (1430° K). Alloys can be used to tailor the temperature.

The operating temperature of the second reactor 230 is maintained lower than would otherwise be required by continuously introducing into the molten pool 232 an inert gas, such as argon, through an inlet 256. The lithium concentration in the lower layer 232 of the reactor 230 is thus maintained at a low level. The continuous use of the inert gas tilts the thermodynamic equilibrium in favor of the lithium, allows the operating temperature to be reduced significantly and achieves higher yields at lower temperatures. Without the inert gas, the second reactor 230 would have to be maintained at about 1850° K to obtain the same yield as 1500° K with the inert gas. The temperature in the second reactor 230 may also be influenced by using an iron alloy such as iron-manganese (FeMn).

When the carbon components are introduced directly into the reactor 230, they may include natural gas, which is flowable into the reactor 230 through inlet 256 or a similar inlet.

In accordance with a further feature of the invention, there is provided a method for converting metal oxides and hydroxides to the elemental metals thereof.

The assembly and method provide for a substantially closed-loop conversion, without discharge of harmful elements into the atmosphere.

Other embodiments are within the scope of the following claims. For example, elemental metals other than lithium may be recovered, such as sodium and potassium. Alkaline-earth metals, such as magnesium and calcium, could also be recovered.

What is claimed is:

1. A method of operating a hydrogen-fueled device, the method comprising conveying hydrogen released from a composition to the device, the composition comprising a carrier liquid, a dispersant, and a chemical hydride, wherein the dispersant comprises a triglyceride.

2. The method of claim 1, further comprising contacting the composition with water.

3. The method of claim 1, further comprising removing water from the hydrogen released from the composition.

4. The method of claim 1, further comprising controlling a reaction temperature from the release of the hydrogen.

5. The method of claim 1, further comprising conveying water from the device to a water reservoir.

6. The method of claim 1, further comprising separating the hydrogen from a hydroxide product.

7. The method of claim 1, further comprising pumping the composition to a reactor.

8. The method of claim 1, wherein the carrier liquid comprises mineral oil.

9. The method of claim 1, wherein the triglyceride comprises triolein.

10. The method of claim 1, wherein the chemical hydride comprises magnesium hydride.

11. The method of claim 1, wherein the chemical hydride comprises lithium hydride.

12. The method of claim 1, wherein the the carrier liquid comprises mineral oil, the chemical hydride comprises magnesium hydride, and the triglyceride comprises triolein.

13. The method of claim 1, wherein the composition comprises about 50 to about 75% by weight of the chemical hydride.

14. The method of claim 1, wherein the device is a fuel cell.

15. The method of claim 1, wherein the device is a combustion engine.

* * * * *

UNITED STATES PATENT AND TRADEMARK OFFICE
CERTIFICATE OF CORRECTION

| | | |
|---|---|---|
| PATENT NO. | : 7,052,671 B2 | Page 1 of 1 |
| APPLICATION NO. | : 10/044813 | |
| DATED | : May 30, 2006 | |
| INVENTOR(S) | : Andrew W. McClaine et al. | |

It is certified that error appears in the above-identified patent and that said Letters Patent is hereby corrected as shown below:

Title Page, (75) Inventors, please insert --Frederick E. Becker, Reading, MA (US)--

Signed and Sealed this

Twentieth Day of February, 2007

JON W. DUDAS
*Director of the United States Patent and Trademark Office*